July 19, 1927.  
D. W. KENT-JONES ET AL  
1,636,569  
TREATMENT OF CEREAL SUBSTANCES  
Original Filed Sept. 3, 1924
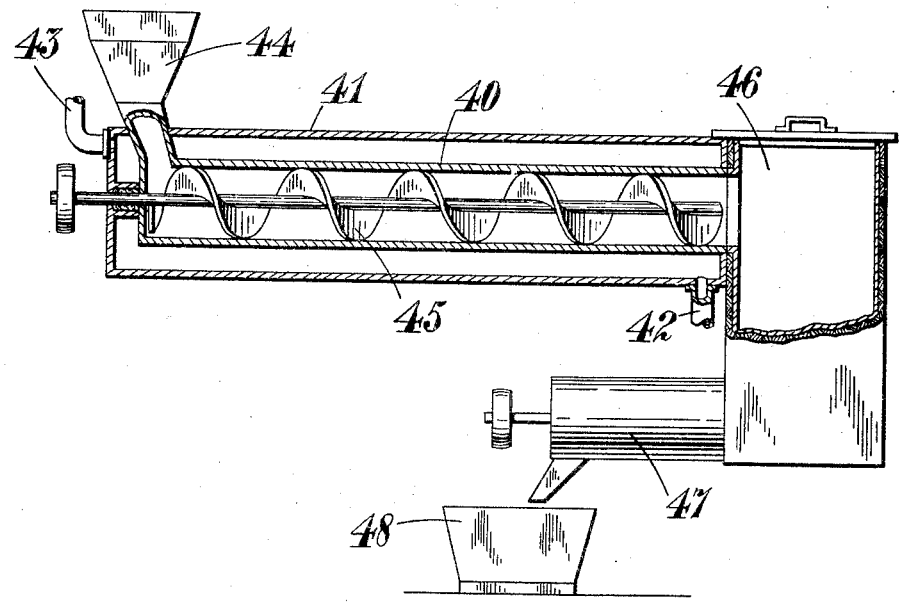
Inventors
Douglas William Kent-Jones
Charles Woodland Chitty
by Byrnes Stebbins & Parmelee
their attorneys Patented July 19, 1927.

1,636,569

UNITED STATES PATENT OFFICE.

DOUGLAS WILLIAM KENT-JONES AND CHARLES WOODLAND CHITTY, OF DOVER, ENGLAND, ASSIGNORS TO WOODLANDS LIMITED, OF CHARLTON GREEN, DOVER, ENGLAND, A BRITISH COMPANY.

TREATMENT OF CEREAL SUBSTANCES.

Original application filed September 3, 1924, Serial No. 735,628, and in Great Britain December 9, 1923. Divided and this application filed November 5, 1925. Serial No. 66,993.

This invention comprises improvements in or relating to the treatment of cereal substances so as to improve their baking qualities and has particular reference to the treatment of wheat flour. The subject matter of the present application is divided out from United State application No. 735,628.

It is known that by heating wheat grains containing or having added to them a sufficient quantity of moisture, at a temperature of something over 100° F. but not over 120° F., the wheat is brought into a suitable condition for milling and also that this treatment may result in a slight increase in "strength" in the resulting flour, that is to say, the flour tends to give a bolder better risen loaf when it is made into dough and baked. The improvement in strength obtained in this way, however, is not substantial and it is often desirable that flour should receive a considerable increase in strength, which is sometimes imparted to it by the addition of chemical "improvers" or by chemical treatment of the flour. It is an object of the present invention to impart strength to the flour to a degree comparable to and even beyond that obtained by "improvers" or chemical treatment, without the necessity of applying any chemicals to the cereals treated.

We have discovered that when wheat or flour is treated at an elevated temperature in the region of 120° to 230° F., the treatment may be continued for a certain time (which is quite long in the case of the lower temperatures and quite short in the case of the higher ones) without any noticeable improvement in the "strength" of flour milled therefrom taking place. For example, in the case of wheat at a temperature of 130° F. a very slight increase (only just perceptible) is noticed in the resulting flour, when the wheat has received six hours treatment. If the treatment is longer than this, however, a considerable change takes place which results in the flour produced having a considerably greater "strength". The maximum effect takes place within 24 hours at the temperature stated. Again at 145° F. after one hour's treatment there is usually no perceptible increase in strength of the resulating flour, but with treatment of the wheat for six hours a considerable improvement in "strength" is obtained.

According to the present invention a process for the treatment of flour so as to improve its "strength" is characterised by heating the flour under non-oxidizing conditions at a temperature approximately between the limits of 120° and 230° F. for a period of time (say for 12 to 16 hours at 145° F. or for one hour at 175° F.) longer than the initial period hereinabove described during which no substantial increase in "strength" is obtained.

If the treatment is continued beyond a certain time it is found that the gluten contained in the resulting dough becomes non-retainable in a washing test—that is to say—if the flour is made into a dough with water and after say one hour in water is then washed in running water substantially all the gluten washes away with the starch and none is retained in the hand. Flour so heated cannot be satisfactorily made into bread unless it is blended with untreated flour but it is found that if it is so blended good results are obtained, as more fully set forth in the United States patent application of Hutchinson, Serial No. 728,414.

Preferably, however, the period of time of the treatment is so limited as to be less than that which at the temperature employed, will render the gluten contained in the resulting dough non-retainable in a washing test as hereinabove described. Conveniently the temperature in this case should not exceed 200° F.

The heating may be carried out at various pressures but is preferably carried out at not less than atmospheric pressure.

The heat employed is a dry heat, that is to say, the material is not treated by steam, and consequently the starch granules of the flour are not broken up but remain substantially intact. The presence of a small quantity of moisture in the flour is not detrimental and indeed cannot be avoided.

The treatment of flour may be carried out by enclosing the flour in cells which are immersed in hot water. The cells may be rectangular and should have one dimension quite small, say, not more than 1½ inches from front to back so that the heat can penetrate the flour rapidly, since flour is a bad conductor of heat. Under these conditions a cell immersed in water at a temperature of 180° F. will attain a temperature in the middle of the cell of 133° F. in 25 minutes, the average temperature of the flour being 165° F.

Successful results have been obtained on flour milled from English wheat blended with other wheats when heated in cells as above described, for the following periods:—

120° F. for 4 days, 130-135° F. for 24 hours, 145-150° F. for 12-16 hours, 160° F. for 1½-2 hours, 175° F. for 45-50 minutes, 180° F. for 25 minutes.

The temperatures given are the temperatures of the water bath.

Heating the flour to 175° F. for 2½ hours brought the flour to a condition in which its baking qualities were completely destroyed, as also did heating to 160° F. for 6-7 hours, the flour reaching a state when it could no longer be made into dough, unless blended with untreated flour as above described.

During the treatment the flour loses about 2% of moisture which can be replaced if desired by spraying. After the treatment it is cooled down to stop the action and is sifted to remove any small soft lumps which may have been formed within it. In the sifting, the lumps become broken up.

Referring now to the drawing, this shows diagrammatically an apparatus for the treatment of flour so as to afford a continuous process.

The flour is passed through a tubular conduit 40 which is surrounded by a water-jacket 41 having an inlet 42 for hot water and an outlet 43. The flour is introduced through a hopper 44 and fed through the conduit by a rotating feed worm 45. It falls at the end through a discharge mouth into a bin 46 where it is stored for the requisite time to complete the treatment, and is finally withdrawn by a conveyor 47 into a discharge hopper 48. The size of the bin 46 is so calculated that with flour entering and leaving it at the same rate and the bin remaining full, the flour will remain in it for the desired time.

The conveyor 47 may conveniently take the form of a "Redler" conveyor.

The temperature of the water-jacket may be regulated by means of a thermostat.

The flour conditioned as described has greatly improved strength and also improved capacity for absorbing water, and that to a greater extent than can be accounted for by the water evaporated during the process.

Low grade flours (i. e. flours from the later breaks and reductions, which contain a relatively large amount of gluten of poor quality) are much more improved by this process than are the "patent flours".

The term flour is used in this specification as including those types of milling stock known as semolina, middlings and dunst and in fact as including all kinds of wheaten stock after the grain has been broken so that its interior becomes exposed.

What we claim as our invention and desire to secure by Letters Patent is:—

1. A continuous process for the treatment of wheat flour so as to improve its baking qualities which consists in introducing it into a closed conduit raising the temperature of the walls of the conduit so that the flour becomes heated to a temperature lying in the region of 120 to 230 degrees Fahrenheit and feeding the flour through the conduit at such a rate that it will be maintained in the conduit at the required temperature for a time long enough to impart to it a substantial increase in strength but not so long as to render the contained gluten non-retainable in a washing test as described.

2. A process for the treatment of wheat flour consisting in dry-heating the substance under conditions which exclude the passage of air currents over the substance to a temperature approximately between the limits of 120 and 230 degrees Fahrenheit for a period of time less than that which will render gluten contained in dough made from the product non-retainable in a washing test as herein described, but long enough to yield an increase in the "strength" of the resulting flour substantially as herein set forth.

3. A process for the treatment of wheat flour so as to improve its "strength" characterized by heating the flour under non-oxidizing conditions at a temperature approximately between the limits of 120 degrees and 230 degrees Fahrenheit for a period of time longer than the initial period herein described during which no change in the character of the gluten-forming constituents takes place such as to yield a substantial increase in "strength" but less than that which will render gluten contained in dough made therefrom non-retainable in a washing test as herein described.

4. A process for the treatment of wheat flour consisting in dry-heating the substance under conditions which exclude the passage of air currents over the substance to a temperature approximately between the limits of 120 to 230 degrees Fahrenheit for a period of time less than that which will render gluten contained in dough made from the product non-retainable in a washing test as herein described, but not substantially less than a minimum which ranges between half an hour at 180 degrees Fahrenheit and eight hours at 140 degrees Fahrenheit.

5. A process for the treatment of wheat flour consisting in dry heating the substance at not less than atmospheric pressure to a temperature approximately between the limits of 120 and 230 degrees Fahrenheit for a period of time less than that which will render gluten contained in dough made from the product non-retainable in a washing test but longer than the initial period during which no change in the character of the gluten-forming constituents takes place such as to yield a substantial increase in "strength" of the flour and thereafter cooling the substance at not less than atmospheric pressure.

6. A process for the treatment of wheat-flour for the purpose of increasing the "strength" thereof consisting in dry heating the substance at not less than atmospheric pressure to a temperature approximately between the limits of 120 and 230 degrees Fahrenheit for a time sufficient to substantially effect an optimum improvement in the strength of the flour and thereafter cooling the substance at not less than atmospheric pressure.

In testimony whereof we affix our signatures.

DOUGLAS WILLIAM KENT-JONES.
CHARLES WOODLAND CHITTY.